United States Patent
Jalkanen et al.

(10) Patent No.: US 7,333,479 B2
(45) Date of Patent: Feb. 19, 2008

(54) RFID SYSTEM WITH PACKETIZED DATA STORAGE IN A MOBILE ENVIRONMENT: METHODS, SYSTEMS AND PROGRAM PRODUCTS

(75) Inventors: Janne Jalkanen, Helsinki (FI); Marko Perttilä, Pernaja (FI)

(73) Assignee: Nokia Corporation, Espoo (FI)

( * ) Notice: Subject to any disclaimer, the term of this patent is extended or adjusted under 35 U.S.C. 154(b) by 124 days.

(21) Appl. No.: 10/608,019

(22) Filed: Jun. 30, 2003

(65) Prior Publication Data
US 2004/0264441 A1 Dec. 30, 2004

(51) Int. Cl.
*H04L 12/56* (2006.01)
*H04Q 5/22* (2006.01)

(52) U.S. Cl. .................. 370/352; 370/465; 340/10.41; 340/10.51

(58) Field of Classification Search ............... 370/310, 370/310.2, 317–319, 324, 328, 351–356, 370/389, 395.52, 428, 521; 340/10.1, 572.1, 340/572.2, 572.4, 10.41, 10.42, 10.51
See application file for complete search history.

(56) References Cited

U.S. PATENT DOCUMENTS

| | | | | |
|---|---|---|---|---|
| 6,150,921 | A | 11/2000 | Werb et al. ................. | 340/10.1 |
| 6,192,417 | B1* | 2/2001 | Block et al. ................ | 709/249 |
| 6,398,105 | B2 | 6/2002 | Ramberg et al. ........... | 235/375 |
| 6,448,979 | B1 | 9/2002 | Schena et al. .............. | 345/741 |
| 6,608,841 | B1* | 8/2003 | Koodli ....................... | 370/474 |
| 6,705,522 | B2* | 3/2004 | Gershman et al. .......... | 235/385 |
| 6,711,740 | B1* | 3/2004 | Moon et al. ................. | 719/328 |
| 6,763,996 | B2* | 7/2004 | Rakers et al. ............... | 235/375 |
| 6,853,294 | B1* | 2/2005 | Ramamurthy et al. ..... | 340/10.1 |
| 6,857,013 | B2* | 2/2005 | Ramberg et al. ........... | 709/223 |
| 2002/0065728 | A1* | 5/2002 | Ogasawara .................. | 705/23 |
| 2002/0071432 | A1* | 6/2002 | Soderberg et al. .......... | 370/389 |
| 2004/0043788 | A1* | 3/2004 | Mittal ........................ | 455/558 |
| 2004/0049451 | A1* | 3/2004 | Berardi et al. ............... | 705/39 |

(Continued)

OTHER PUBLICATIONS

"Internet Working With TCP/IP" by Douglas E. Comer, published by Prentices Hall, Upper Saddle River, New Jersey 07458 (ISBN 0-13-216987-8) (v.1), 1995, pp. 165-167; 91-101.

(Continued)

*Primary Examiner*—Wing Chan
*Assistant Examiner*—Saba Tsegaye
(74) *Attorney, Agent, or Firm*—Morgan & Finnegan LLP (57) ABSTRACT

An RFID system includes transponders transmitting or receiving packetized data in standard form in lieu of custom format for applications executable in a mobile device or network. Tag data may be packetized in any of several standard formats. Each format includes a layer to identify packet format. In one embodiment, a tag contains a standard UDP header with a checksum and payload data. The application opens a socket to listen to UDP connections. The device transmits a RF signal activating tags which transmit UDP packets to a RFID reader in the device. The packets are passed to an IP stack which strips away the UDP header and validity of the checksum verified. If verified, the device transmits the payload to an application running in the device or a network, otherwise, the IP stack notifies the tag the transmission failed and requests re-transmissions which are repeated until a successful transmission occurs.

41 Claims, 6 Drawing Sheets

U.S. PATENT DOCUMENTS

2004/0100363 A1\* 5/2004 Lane et al. ............... 340/5.86
2005/0010750 A1\* 1/2005 Ward et al. ............... 713/150
2006/0164239 A1\* 7/2006 Loda .................... 340/539.22

OTHER PUBLICATIONS

"Cellular Radio Principles and Design", by R. C. V. Macario, published by McGraw-Hill, NY, NY, 1993 (ISBN: 0-07-044301-7) p. 210.

"RFID Handbook—Radio-Frequency Identification Fundamentals and Applications" by K. Finkenzeller, published by John Wiley & Sons LTD, New York, NY (ISBN 0-471-98851 0) 1999, pp. 6-7; Chapter 11; pp. 171-177.

"802.11 Wireless Networks as the Definitive Guide", by Matthew S. Gast, published by O'Reilly, Associates, Inc. Sebastopol, CA (ISBN: 0-596-001883-5), 2002, Chapter II.

\* cited by examiner

RFID SYSTEM WITH PACKETIZED DATA STORAGE IN A MOBILE ENVIRONMENT: METHODS, SYSTEMS AND PROGRAM PRODUCTS

RELATED APPLICATION

Application Ser. No. 10/180,267 filed Jun. 26, 2002, entitled, "Apparatus and Method for Facilitating Physical Browsing on Wireless Devices Using Radio Frequency Identification (NC 28681), assigned to the assignee of the present invention and fully incorporated by reference.

BACKGROUND OF INVENTION

1. Field of Invention

This invention relates to automatic identification systems, methods and program products. More particularly, the invention relates to an RFID system with packetized data storage in a mobile environment: methods, systems and program products.

2. Description of Prior Art

Mobile communication devices, typically cell phones, laptops and other portable devices are active with cellular wireless or short-range wireless systems. Cellular systems require service areas to be arranged into cells, which have their own transmitter and receiver base stations. In each cell a group of frequencies are used by the mobile devices for communication with other devices and external networks via the base station. Cellular systems have ranges in the order of kilometers. The frequency bands and other parameters for cellular systems are described in the text "Cellular Radio Principles and Design", by R. C. V. Macario, published by McGraw-Hill, NY, N.Y., 1993 (ISBN: 0-07-044301-7) at page 210.

Short-range wireless systems operating with mobile communication devices operate in the unlicensed portion of the radio spectrum, usually either in a 2.4 GHz Industrial, Scientific, and Medical (ISM) Band or the 5.0 GHz Unlicensed-National Information Infrastructure (UINII) Band, and have a typical range of one hundred meters or less. Short-range wireless systems can be combined with systems wired to the Internet to provide communication over long distances via an access point. A description of short-range wireless systems is described in the text, "802.11 Wireless Networks as the Definitive Guide", by Matthew S. Gast, published by O'Reilly, Associates, Inc. Sebastopol, Calif. (ISBN: 0-596-001883-5), 2002, Chapter II.

Short-range wireless communications systems find use in automatic identification systems (AIS). Radio Frequency Identification (RFID) systems are one embodiment of AIS which find use in short-range wireless communication system. The typical RFID system includes a RFID reader and a RFID transponder linked together by a radio frequency generated by the reader. The transponder is attached or coupled to an item for identification purposes. RFID systems are described in the text "RFID Handbook—Radio-Frequency Identification Fundamentals and Applications" by K. Finkenzeller, published by John Wiley & Sons LTD, New York, N.Y. (ISBN 0-471-98851 0) 1999, pages 6-7, and fully incorporated herein by reference.

In one embodiment, the reader may be incorporated into a mobile device which communicates with the RFID transponder via a radio frequency signal. The reader sends out a RF signal that "wakes up" the RFID transponder. The transponder may be active or passive. In response to the RF signal, the transponder transmits a data signal back to the reader via a RF frequency signal. The transponder or "tag" includes a memory and is incorporated into an item. The tag stores data descriptive of the item for identification purposes. An exemplary tag information block is described in related application, Ser. No. 10/180,267, filed Jun. 26, 2002, supra, beginning at page 24, line 18, and shown in FIG. 5. The memory may be random access or read only or erasable read only memory and the like. Data is stored in the memory in a customized data structure and format, according to the requirements of an application executable in the mobile devices or in an external network. Most RFID applications define an entire vertical structure from the format of the bits of the RFID tag to the top-level application behavior. Each time a new application is created, the data structure and format of the tag must be customized to meet the requirements of the new application. Re-creating the data structure and format for new applications is expensive and time consuming. Moreover, the customized data structure and format limits processing of the tag data for the application executing in the mobile device and can impede off-loading the tag data to other external data processing system. What is needed in the art is a RFID system in a mobile environment having a data structure and format for tag information which facilitates (a) creating new applications or changes to existing applications executable in the mobile device or another environment with minimum effort; (b) reading or writing tag data between the tag and the mobile device or an external network, and (c) allowing external applications to be transferred to the RFID environment with no or little modification.

Prior art related to the present invention includes the following:

A. U.S. Pat. No. 6,398,105B2 entitled "Automatic Data Collection Device That Intelligently Switches Data Based On Data Type", issued Jun. 4, 2002 discloses intelligently routing data received from an automatic data collection ("ADC") device in an ADC device platform based on its type. A data routing mechanism operates on the data-receiving side of an ADC data server. After identifying the characteristics of the input data, the data routing mechanism determines the destination for the data based on the characteristics then routes the data to the selected destination. For some types of data, the selected destination may be an intermediate destination where the data undergoes additional processing before being transmitted to another location, while for other types of data the selected destination may be the application that ultimately processes the data. For example, the data routing mechanism may receive a set of input data, analyze the data to determine that the data is voice data, and then route the data to a speech recognition module that processes voice data. ADC devices accommodated by the system include bar code readers, speech recognition systems, RF tag readers, resonator readers, and two-dimensional symbol readers optical character recognition ("OCR") systems. The invention finds application within a network of ADC device platforms that receive requests for input data from both local and remote applications. Data may be communicated to remote users using any data protocol, including the Transmission Control Protocol ("TCP"), the User Datagram/Internet Protocol ("UDP/IP") or the User Datagram Plus Protocol ("UDP+").

B. U.S. Pat. No. 6,150,921 entitled "Article Tracking System", issued Nov. 21, 2000 discloses tracking mobile tags. Cell controllers with multiple antenna modules generate a carrier signal which is received by the tags. Tags shift the frequency of the carrier signal, modulate an identification code onto it, and transmit the resulting tag signal at randomized intervals. The antennas receive and process the response, and determine the presence of the tags by proximity and triangulation. Distance of a tag from an antenna is calculated by measuring the round trip signal time. The cell controllers send data from the antenna to a host computer. The host computer collects the data and resolves them into positional estimates. Data are archived in a data warehouse, such as an SQL Server. The tag datagram may contain a header to enable the cell controller to detect the tag's presence, an identifier preamble, which may be implemented, for example, as a validity check such as a cyclic redundancy check (CRC), the tag's UID and optional data sections, which can include data from within the tag.

C. U.S. Pat. No. 6,448,979 entitled "Printed medium activated interactive communication of multimedia information, including advertising" discloses communicating multimedia information using a scanner for machine-readable code containing a link information corresponding to a provider information depicted on the printed medium. A user interface obtains user input information corresponding to the provider information. A communications bridge sends the link information and the user input information via the network. A receiver in communication with the scanner, capable of receiving the link information and user input information, and further capable of receiving and playing a multimedia information sequence. A portal server in communication with the scanner via the network capable of selecting a multimedia information sequence corresponding to the link information and the user input information.

None of the prior art discloses or suggests an RFID system in a mobile environment which satisfies the needs of the art for creating new application with minimum effort by using a packetized and preferably standardized data structure and format which facilitates reading and writing data to a tag and enables external application data to be communicated within the RFID environment.

SUMMARY OF THE INVENTION

An RFID system includes transponders or tags or data carriers having stored packetized data in a standard form in lieu of custom format which facilitates data transfer to/from the tags and access to extended applications running in a device, typically a mobile device or a network. The tag data may be packetized in any of several formats including standardized and globally addressable formats such as e.g. UDP, IPv4, IPv6, and the like, alone or in combination. This allows even more complicated protocols known in the art such as HTTP, HTTPU, etc, to be layered on top of the basic formats such as UDP, IPv4, IPv6, etc. Each format includes a layer to identify the packet format in the tag. In one embodiment, a tag contains UDP packets including a standard UDP header with a checksum and payload data. An application in the device opens a socket to listen to UDP connections. The device transmits a RF signal for activating tags within the coverage of the device. In response, the tag transmits IP packets to a RFID reader in the device, which strips the RFID header, and passes the packets to an IP stack in the device. The IP header is stripped away by the IP stack and the validity of the checksum verified. If verified, the device transmits the payload, which can be an UDP, TCP, or ICMP packet, to the application running in the device, which can send and receive data to/from the tag. Otherwise, the IP stack notifies the tag the transmission failed and requests a re-transmission from the tag which is repeated until a successful transmission occurs or the IP stack drops the packet if re-transmission is unsuccessful after a number of tries or sends a message to the application of the packet failure. In another embodiment, an UDP packet is used instead of an IP packet. The RFID reader in the device reads the packet, and removes the RFID headers, which are used to recognize the payload as an UDP packet. The payload is then transferred to the IP stack, which then delivers the payload to an application running in the device. In another embodiment, a UIDP packet is wrapped within an IP packet for transfer to an application external to the device. An application in the device opens a socket to listen to UDP connections. In response to a device activation signal, tags within the coverage of the device transmit packets to the reader, which passes them to an IP stack in the device. The IP stack parses the IP header; checks the packet destination and verifies the checksum validity. If verified, the packet is passed to the destination address which may be external to the device or passed to an application in the device if a loopback address is contained in the header, otherwise the re-transmission process described in the previous embodiment is conducted. In still another embodiment, data packets in UDP, IP format are transmitted to and stored in the tag from an application running in the device or a network. The RFID reader, which in this case can also function as a writer device, then adds the proper header data for packet recognition before putting the payload on the tag.

An aspect of the invention is a RFID system storing packetized data in transponders or data carriers or tags in standardized formats in lieu of custom format.

Another aspect is a data carrier in a RFID system storing packetized data in UDP/IP formats and combinations thereof with or without fully or partly compressed or shortened or omitted headers.

Another aspect is a mobile terminal and method in RFID system transmitting activation signals to tags within the signal coverage area and sending and receiving packetized data to/from the tags.

Another aspect is a mobile terminal and method in a RFID system including a reader in the terminal capturing and transmitting packetized data from/to a tag.

Another aspect is a mobile terminal and method in a RFID system including a communication protocol stack transmitting and receiving packetized data between a tag and an application running in the terminal or a network.

Another aspect is a mobile terminal and method in a RFID system including an Internet protocol stack routing packetized tag datagrams from tags to/from destinations identified in the tag datagrams Another aspect is a mobile terminal and method in an RFID system decompressing or expanding headers in a tag datagram.

Another aspect is an RFID system and method including a mobile terminal coupled to a transponder for activating the transponder to send and receive packetized data in UDP/IP format and communicating with a network to read the packetized data for an application running in the network or in the terminal.

DESCRIPTION OF THE DRAWINGS

The invention will be further understood from the following detailed description of a preferred embodiment, taken in conjunction with an appended drawing, in which.

DESCRIPTION OF PREFERRED EMBODIMENT

Figure 1:
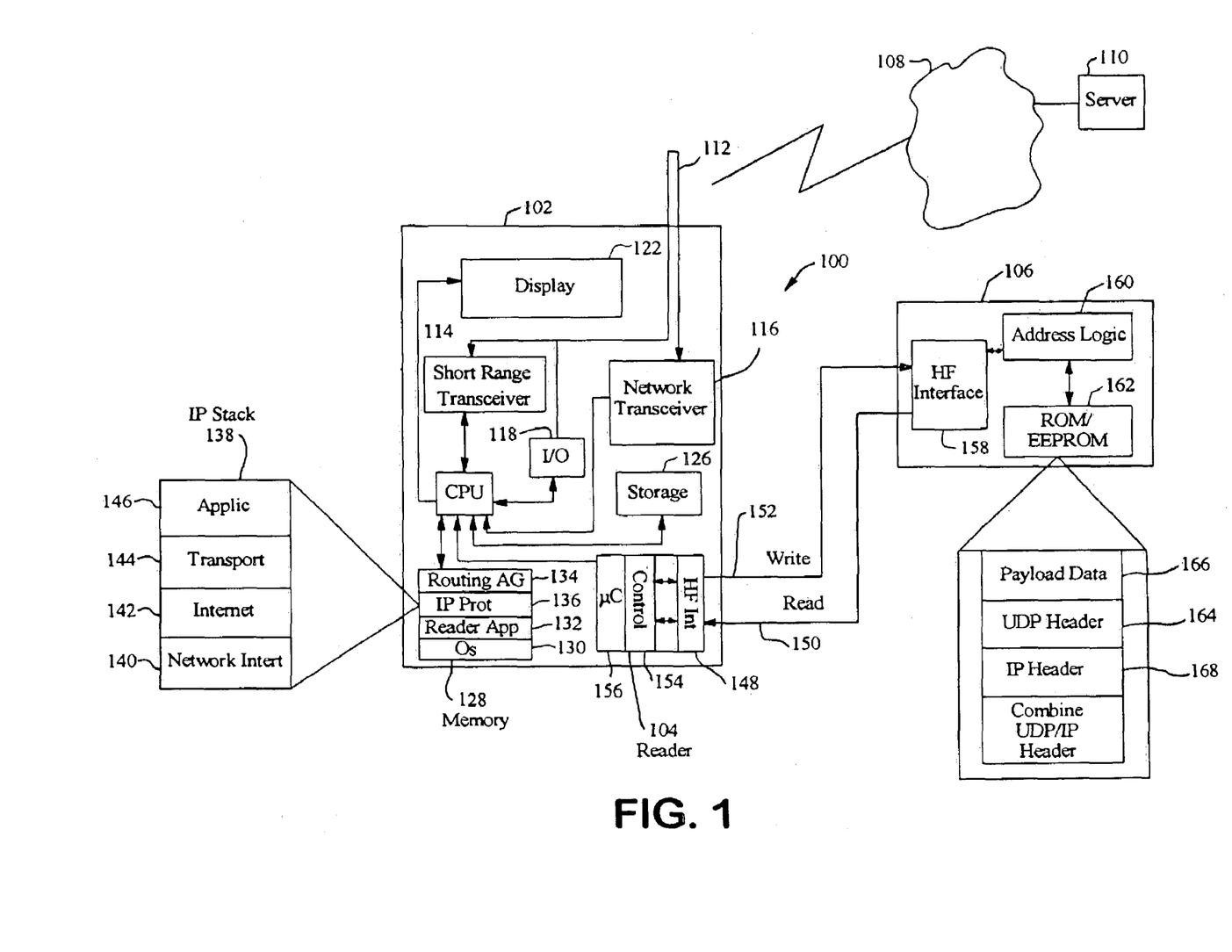
FIG. 1 is a representation of an RFID system including a mobile device containing a reader linked to a transponder and an external network and incorporating the principles of the present invention.

FIG. 1 discloses an RFID system 100 including a mobile device 102 containing an RFID reader 104 linked by a RF frequency to a transponder or tag 106. The mobile device is also linked to an external network 108 including a terminal 110, typically a server. The network 108 can be the Internet, an Intranet, a mobile phone network, a PSTN, a PBX or the like. The device 102 includes antennas 112 for receiving network or cellular transmissions and short-range transmissions. The antennas are coupled to a short-range transceiver 114; a network transceiver 116 and an input/output (I/O) circuit 118. A processing unit (CPU) 120 services the transceivers 114, 116; the I/O circuit 118 and is coupled to a display 122. A keyboard (not shown) enables a user to input instructions and/or data to the processor and responds to commands displayed in the display 122. The processor interacts with a storage unit typically a Read Only Memory (ROM) 126 and a Random Access Memory(RAM) 128. The ROM 126 stores applications executable with the tag 106 and the server 110. The RAM includes software for operating the RFID system. An operating system 130, typically a Microsoft Windows Version controls the operation of the device 102. A reader application 132 enables the device to interact with the reader in reading and writing data from/to the tag 106. A routing application 134 is responsive to Internet Protocols 136 or an IP stack 138.

The IP stack is organized in four conceptual layers where each layer takes responsibility for handling communications with adjacent layers other devices and networks. At the lowest level of the stack, a network interface layer 140 receives and transmits datagrams from/to the RFID reader 104, to be described hereinafter and interfaces with an Internet layer 142. The Internet layer delivers the datagrams to the routing application 134 which decides whether the datagram should be processed locally or forwarded to an appropriate network interface for transmission. If the destination address id is a multicast address (such as e.g. 255.255.255.255) the datagram may be routed to a personal area network, but not outside a gateway. The datagram may thus be transmitted to e.g. a number of nearby Bluetooth devices. A transport layer 144 interfaces with the Internet layer. The transport layer sends or receives data for applications stored in the mobile device or in the external network. An application layer 146 interacts with the transport layer to send or receive data. The application program passes data in the required form to the transport layer for delivery. Data passes up and down the different IP layers according to the data source. Data received from a local application stored in the storage unit 126 or the Internet 108 passes the data down the transport, Internet and network interface layers to the tag 106 via the reader 104. Data passes up the IP stack 138 from the RF tag 106 via the reader 104 to the application stored in the mobile device 102, or an application in the external network. Further details on the functions and operation of the IP stack are described in the text "Internet Working With TCP/IP" by Douglas E. Corner, published by Prentices Hall, Upper Saddle River, N.J. 07458 (ISBN 0-13-216987-8) (v.1), 1995, pages 165-167.

The reader 104 contains a high frequency interface 148 consisting of a receiver and transmitter with an antenna (all not shown). The interface may have two separate data paths for reading 150 and writing 152 from/to the tag 106. A control unit 154, directed by a microprocessor 156, communicates with the application 134 via CPU 120 in the execution of commands and controls communications with the tag. Further details describing the reader are described in the text "RFID Handbook", supra, Chapter 11.

Any type of tag may be used in the present invention. RFID tags can be either active or passive. Active tags require an internal battery or another type of power source and are often read/write tags. Passive tags do not require a dedicated power source, but rather obtain operating power generated from RF signals provided by a reader. Tags may come in a variety of shapes and sizes, but are generally based on a custom-designed silicon integrated circuit. Any transponder/tag may be used in connection with the present invention, and the tag type, size, etc., depends on the particular environment and identification purpose.

Before further describing the tag, a brief description of RFID technology is believed appropriate. RFID technology utilizes electromagnetic or electrostatic coupling in the radio frequency (RF) portion of the electromagnetic spectrum. The reader 104 is miniaturized and includes an interface network layer. Readers are described in the text "RFID Handbook", supra, at Chapter 11. The reader includes an antenna (not shown) for transmitting a RF signal that activates the transponder or tag 106. When the tag is activated, it transmits information back to the reader 104. In the case of a passive tag, the tag may be energized by a time-varying electromagnetic RF wave generated by the reader. When the RF field passes through the antenna coil associated with the tag, a voltage is generated across the coil. This voltage is ultimately used to power the tag and make possible the tag's return transmission of information to the reader, sometimes referred to as back-scattering. The reader passes the information to the IP stack for delivery to the application in the device or to an application in the external network. A processor is coupled to the memory and to the reader. The processor is configured to invoke at least the application and to provide the content to the local application as directed by the reader application.

Now turning to the tag 106, a high frequency interface 158 is linked to an address unit 160 for reading and writing data from/to a memory 162, typically a ROM or EEPROM or the like. The high frequency unit serves as the interface with the reader 104 and may transmit a signal when within the RF zone of the reader. The interface demodulates the reader signals for processing in the address logic unit 160. The address/logic unit 160 controls all reading and writing processes on the tag via a state machine (not shown). Further details on the operation of the tag are described in the text "RFID Handbook", supra pages 171-177.

Data is stored in the ROM/EEPROM 162 in packetized form as datagrams, which usually contain only a few hundred bytes of data and carry a header identification that enables network hardware to know how to send the data to a specified destination. In one embodiment of the invention, a User Data Protocol (UDP) packet is structured to include a header 164 and payload data 166. In another embodiment, Internet Protocol (IP) packet is structured to include an IP header 168 and the payload data 166. Both the UDP and IP headers comprise a field to define the data structure type followed by standardized header and payload. In this way, UDP or IP packets may be stored directly on the tag. Depending on the application, data may be read from the tag or written to the tag.

Figure 2A:
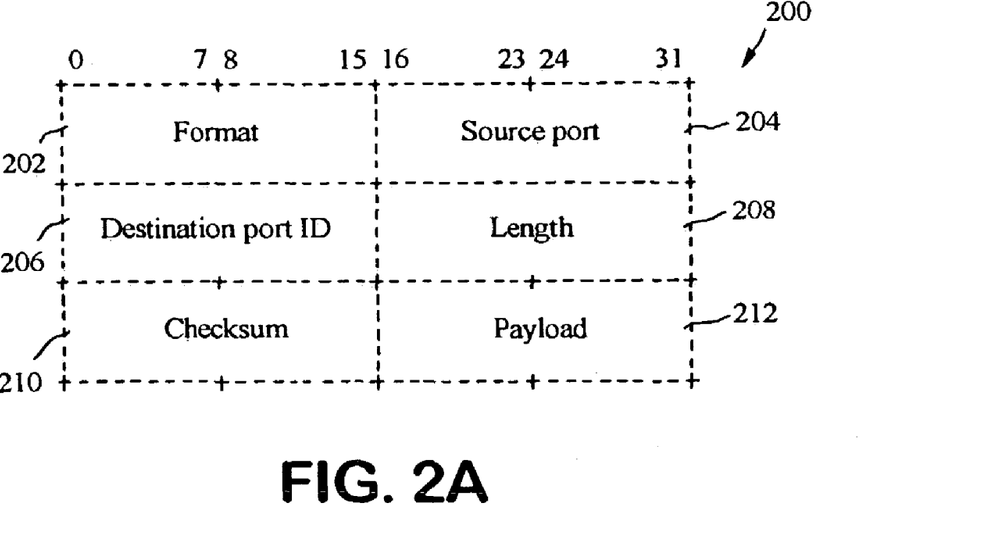
FIG. 2A is a representation of a datagram structure with a User Datagram Protocol (UDP) packet header in the tag of FIG. 1

In FIG. 2A, a UDP packet according to the invention includes a format field 202, a standard UDP header comprising a Source Port ID field 204, a Destination Port ID field 206, packet length field 208, a checksum 210, followed by the payload data 212. The format field comprises bytes 0 and 1 and includes a code, e.g., 0xB58A to define that the packet is a UDP packet. The format field comprises 16-bits. The first byte of the format field is the code, e.g., 0xB58A. The second byte defines the format of the packet. Bytes 2 . . . 10 are standard UDP header fields and bytes from byte 11 are payload data. However, due to the limited storing capacity of the tag, the header of the data packet, e.g., UDP or IP header may be compressed limiting the overhead in the data packet. The compression means that some fields of the standard packet header are omitted or are shorter than standardized fields or are combined together. Another aspect regarding compression of the data carried by the tag is that when additional header fields are added, the data to be transmitted with the RFID signal may end up to a situation, where the RFID tag is not capable of transmitting all the stored data, especially when the tag is of the passive type, with the energy generated by the interrogation signal. Therefore, the excess data needs to be reduced by compressing and reducing the overhead. In the case of receiving data from the tag, the compressed and/or omitted header fields of the received data packet may be decompressed in the mobile device by adding the omitted fields to the header or inflating the fields to comply with the standard format. In a decompression process, data stored in the mobile device may be used. Such data may comprise, for example, one or more lookup tables for compressed fields or data which is received and stored in the mobile device or inputted by the user. Fields of the type such as "length" or "checksum" may be computed by the processor of the mobile device and added to the respective fields. After decompression the forwarded data packets comply with the standard packet formats, such as IP or UDP. In case of receiving data from the application and writing it to the tag, the same technology may be applied in the opposite way. In this case, standard IP or UDP packets are compressed and the resulting optimized packet is written to the tag. The known header compression techniques may be applied as described, for example, in "RFC 1144, RFC 2507," etc.

Figure 2B:
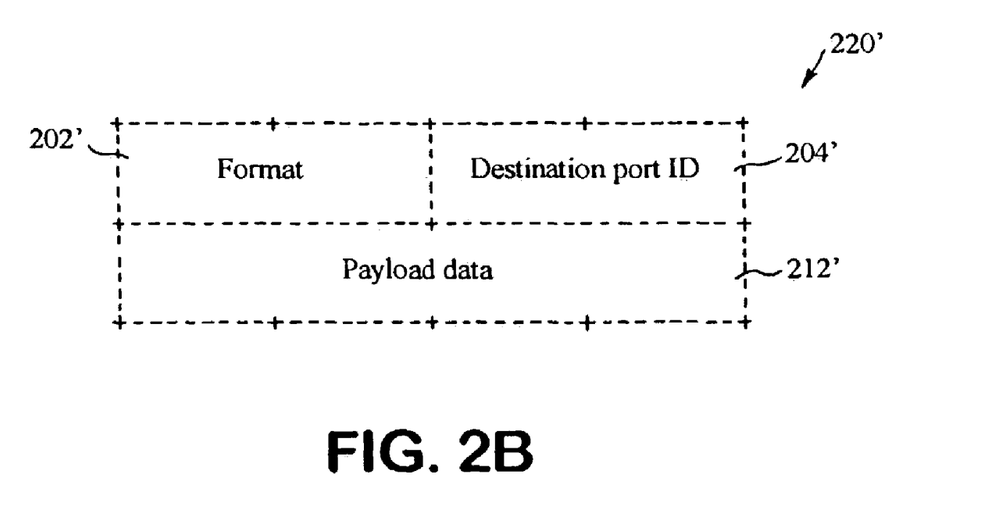
FIG. 2B is a representation of a datagram structure with a compressed User Datagram Protocol (UDP) header in the tag of FIG. 1.

FIG. 2B describes an example of an RFID tag data structure 220 according to one embodiment of the invention in compressed UDP header format, comprising a format field 202', a destination port ID field 204', and a payload data 212'. The field source port ID", "length", and "checksum" are omitted from the tag data. When the data packet is received in the mobile device, the format field content instructs the processor that the omitted fields are to be defined and/or computed and the header is appended with the fields created by the processor. To show that the format field of FIG. 2B is different from FIG. 2A, the format field content can be coded, e.g., 0XB58B.

Figure 3:
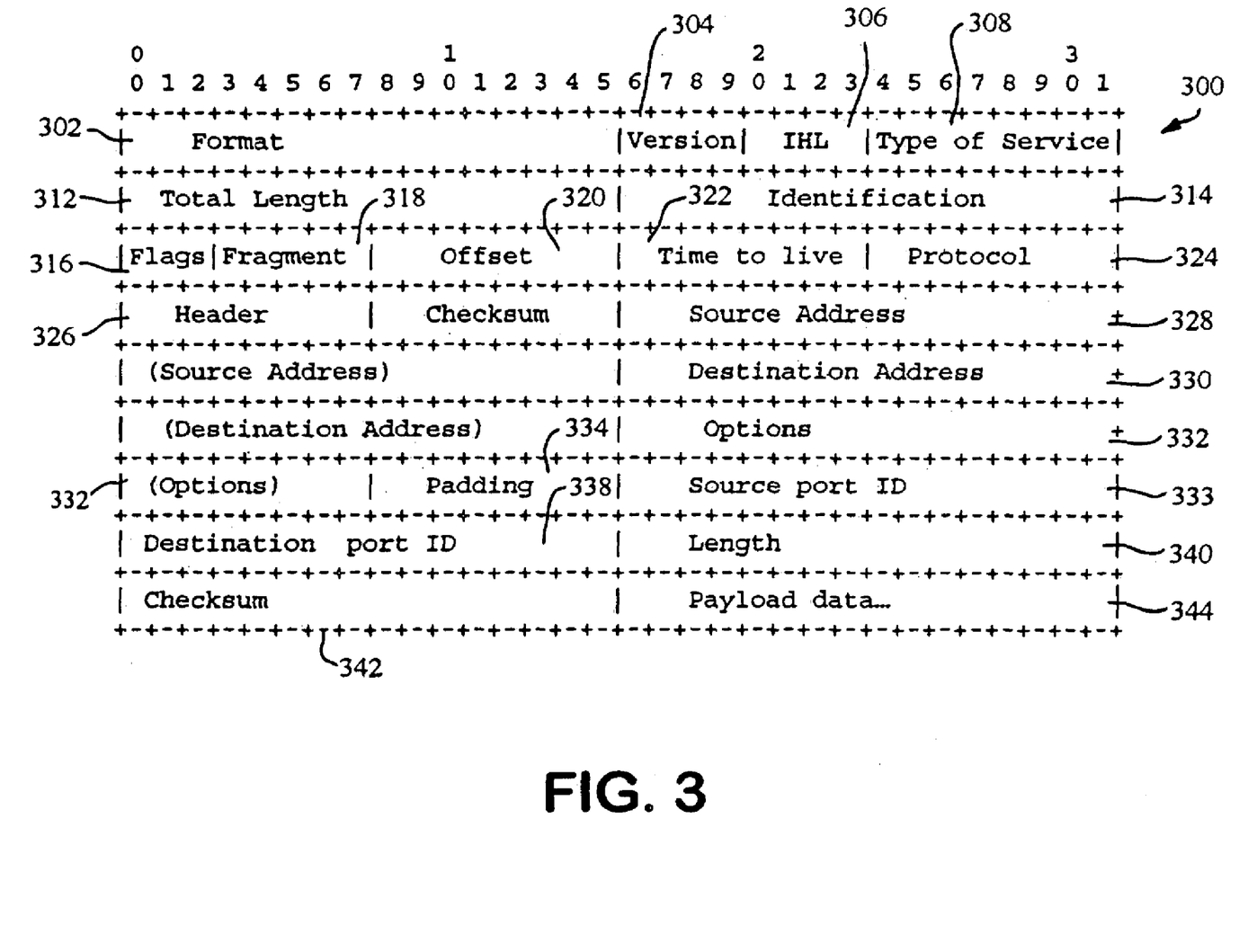
FIG. 3 is a representation of a datagram structure for a combined Internet Protocol Version 4 (Ipv4) packet header and a UDP header in the tag of FIG. 1.

FIG. 3 describes a datagram structure 300 for Internet Protocol, version 4 (IPv4). A format field 302 is coded, e.g., 0XB5B7 defining the packet format to be IPv.4 compliant. Bytes 2 . . . 25 are standard IP header fields and bytes 26 . . . 33 are UDP header fields. Payload data follows byte 33. A version field 304 defines the header format. An Internet Header Length (IHL) field 306 describes the length of the header. A type of service field 308 describes the quality of Internet service to be applied to the packet. A total Length field 312 describes the length of the packet. An Identification field 314 includes an identifier which uniquely identifies fragments of the datagram. The flag field 316, fragmentation field 318 and a fragment off-set field 320 control fragmentation and reassembly of the datagram. The low order 2-bits of the flag field controls fragmentation of the datagram. A Fragmentation field 318 defines the fragment size for fragmenting the datagram. A fragment off-set field 320 specifies the offset in the original datagram in units of 8 octets, starting at offset 0. A time to live field 322 defines how long in seconds the datagram is allowed to remain in the Internet system. A Protocol field 324 defines which high level protocol was used to create the message being carried in the datagram. The header checksum field 326 insures the integrity of header values. A source address field 328 and destination address field 330 contain 32-bit IP addresses of the datagram sender and intended recipient. An options field 332 comprising three bytes is included primarily for network testing and/or debugging. A padding field 334 is used to insure that the IP header ends and data begins on a 32-bit boundary. The padding is composed of zeros. A Source Port ID field 333, destination port ID field 338, Length field 340 and checksum 342 correspond to the UDP fields described in FIG. 2A. Payload data 344 follows the UDP header. Further details of the datagram in IP version 4 format are described in the text "Internet Working With TCP/IP", supra, at pages 91-101.

The data packet itself may be compressed using a compression algorithm such as e.g. Lempel-Ziv or GZIP algorithm. If the headers are compressed as well, the data in the format field then may be chosen so that it reflects and informs the type of compression.

Figure 4:
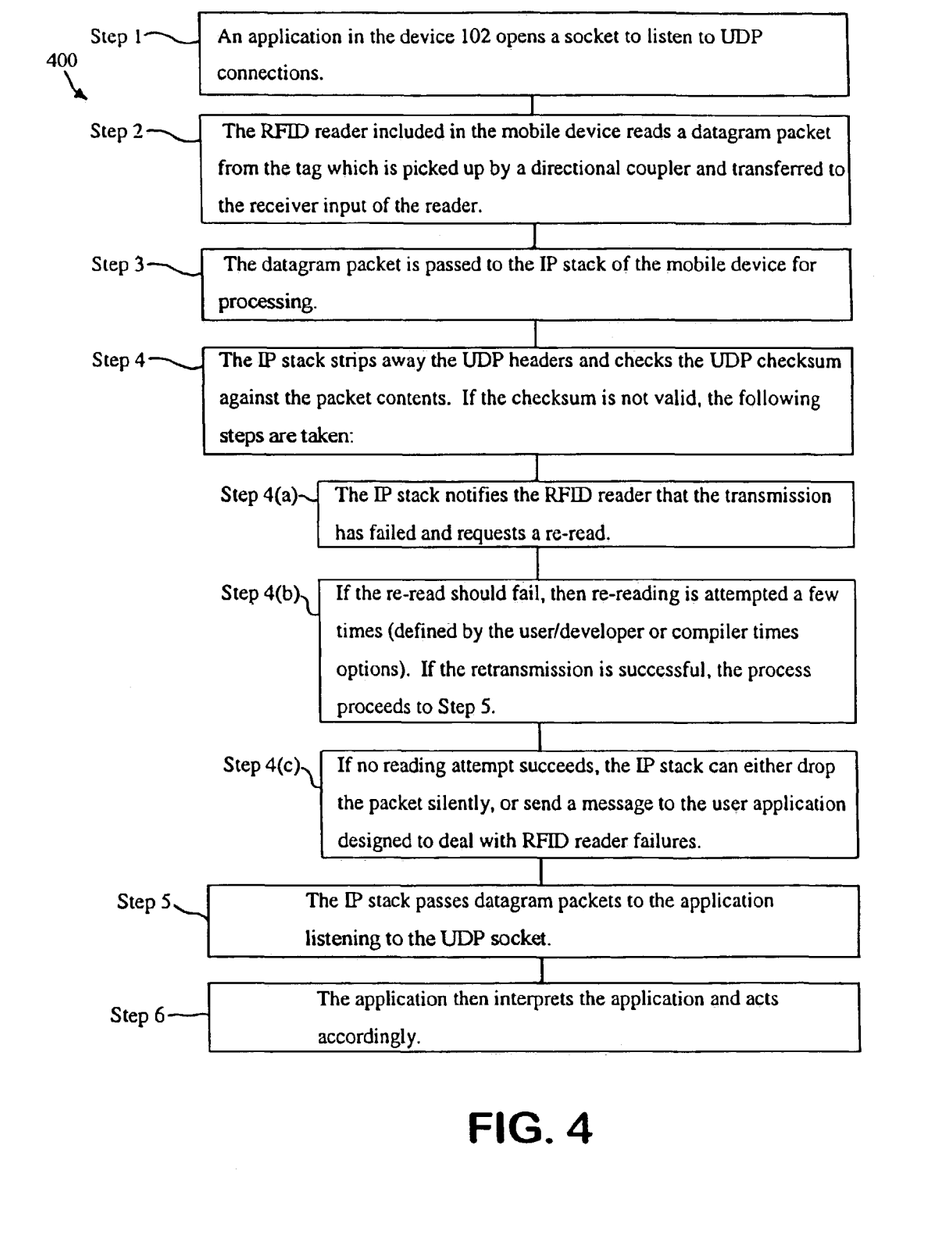
FIG. 4 is a flow diagram of the mobile device of FIG. 1 processing a UDP packet in the tag of FIG. 2A.

FIG. 4 taken in conjunction with FIG. 1 describes a process 400, in steps, for reading from the tag a datagram packet having a UDP header, shown in FIG. 2A, as follows:

Step 1: An application in the device 102 opens a socket to listen to UDP connections.

Step 2: The RFID reader included in or connected to the mobile device reads a datagram packet from the tag which is picked up by a directional coupler and transferred to the receiver input of the reader.

Step 3: The datagram packet is passed to the IP stack of the mobile device for processing.

Step 4: The IP stack strips away the UDP headers and checks the UDP checksum against the packet contents. If the checksum is not valid, the following steps are taken:

Step 4(a): The IP stack notifies the RFID reader that the transmission has failed and requests a re-read.

Step 4(b): If the re-read should fail, then re-reading is attempted a few times (defined by the user/developer or compiler times options). If the retransmission is successful, the process proceeds to Step 5.

Step 4(c): If no reading attempt succeeds, the IP stack can either drop the packet silently, or send a message to the user application designed to deal with RFID reader failures.

Step 5: The IP stack passes the payload data to the application listening to the UDP socket.

Step 6: The application then interprets the data and acts accordingly.

Figure 5:
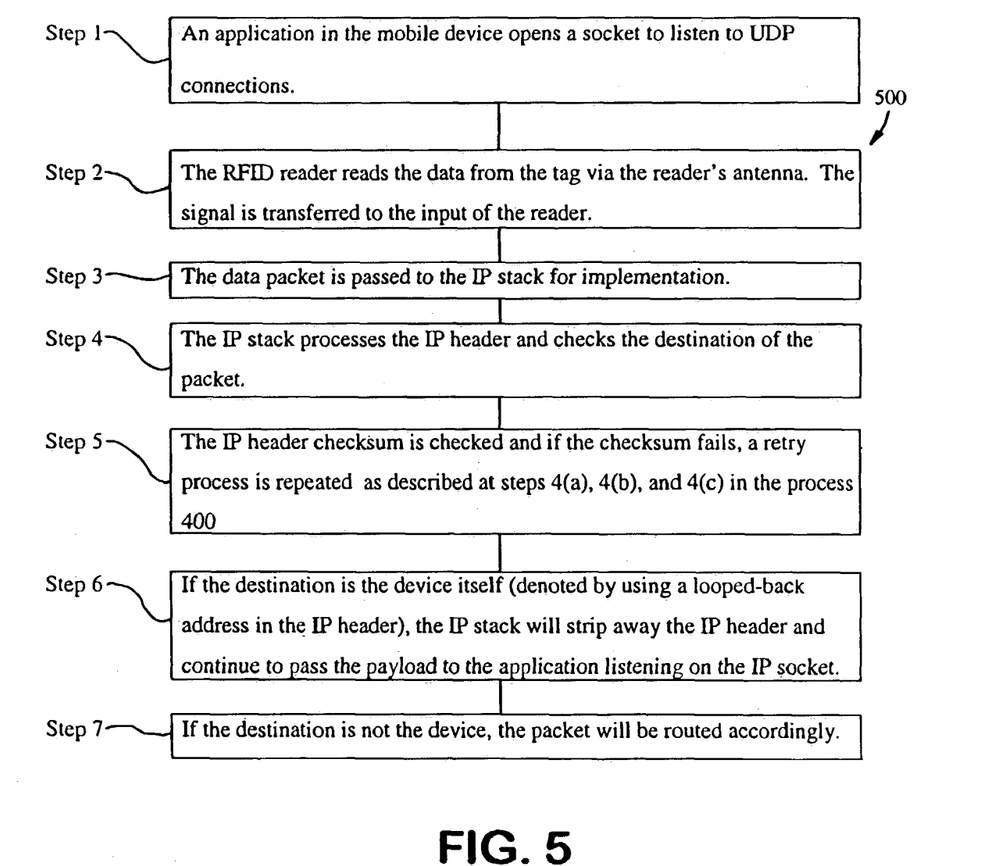
FIG. 5 is a flow diagram of the mobile device of FIG. 1 processing an IP/IUDP packet in the tag of FIG. 3.

FIG. 5 describes a process 500, in steps, for receiving data from a tag including an IP header, shown in FIG. 3, as follows.

Step 1: An application in the mobile device opens a socket to listen to IP, TCP or UDP connections.
Step 2: The RFID reader in the device or connected to it reads the data from the tag via the reader's antenna. The signal is transferred to the input of the reader.
Step 3: The data packet is passed to the IP stack in the device for implementation.
Step 4: The IP stack processes the IP header and checks the destination of the packet.
Step 5: The IP header checksum is checked and if the checksum fails, a retry process is repeated as described at steps 4(a), 4(b), and 4(c) in the process 400.
Step 6: If the destination is the device itself (denoted by using a looped-back address in the IP header), the IP stack will strip away the IP header and continue to pass the payload to the application listening on the UDP or TCP socket.
Step 7: If the destination is not the device, the IP packet will be routed accordingly.

Figure 6:
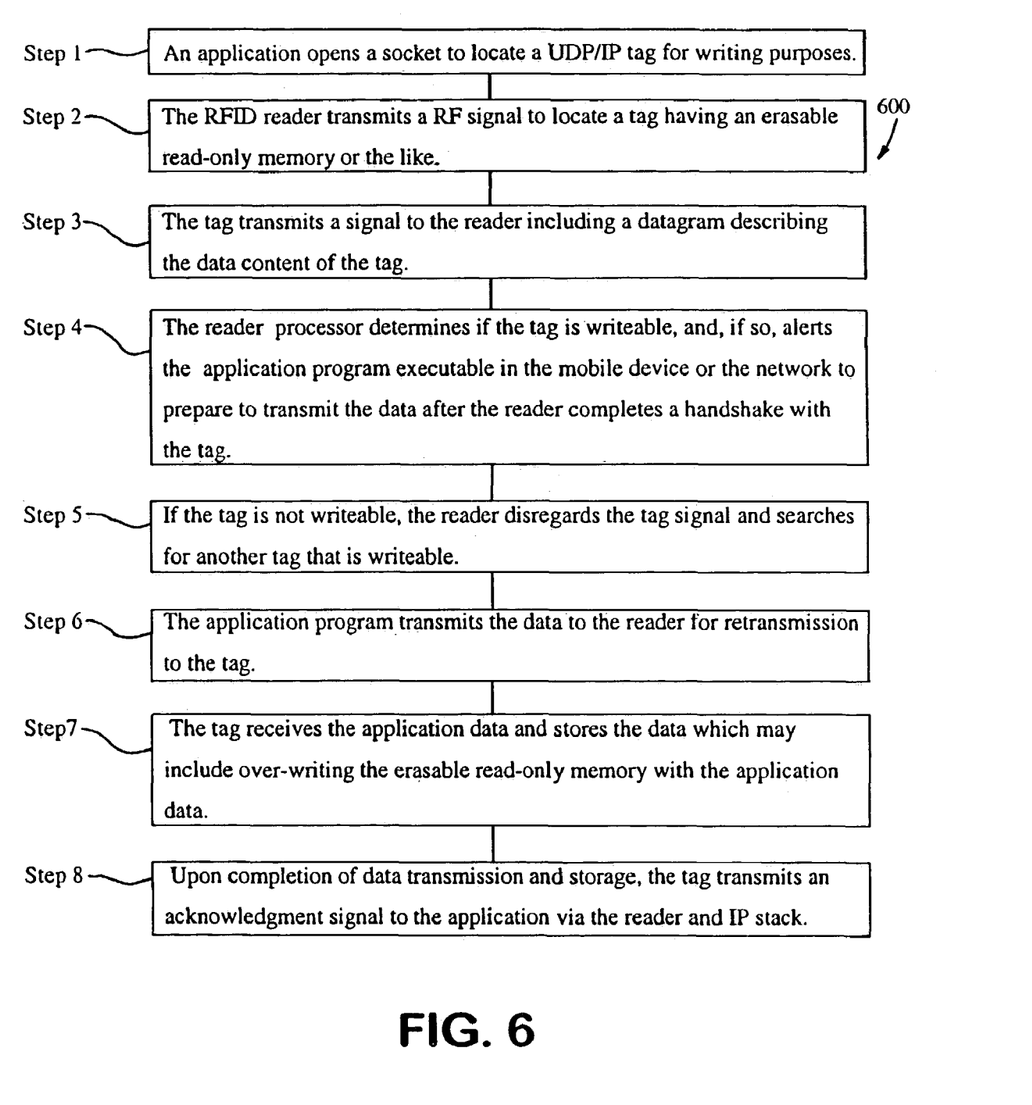
FIG. 6 is a flow diagram of the mobile device writing data to the tag of FIG. 1.

FIG. 6 describes a process 600, in steps, for writing data to the tag from an application in the mobile device or an application in the network, as follows:

Step 1: An application opens a socket to locate a UDP/IP tag for writing purposes.
Step 2: The RFID reader transmits a RF signal to locate a tag having an erasable read-only memory or the like.
Step 3: The tag transmits a signal to the reader including a datagram describing the data content of the tag.
Step 4: The reader processor determines if the tag is writeable, and, if so, alerts the application program executable in the mobile device or the network to prepare to transmit the data after the reader completes a handshake with the tag.
Step 5: If the tag is not writeable, the reader disregards the tag signal and searches for another tag that is writeable.
Step 6: The application program transmits the data to the reader for retransmission to the tag. The reader appends the RFID header information.
Step 7: The tag receives the application data and stores the data which may include over-writing the erasable read-only memory with the application data.
Step 8: Upon completion of data transmission and storage, the tag transmits an acknowledgment signal to the application via the reader and IP stack.

While the RFID system in a mobile environment has been described in terms of a preferred embodiment, various changes can be made therein without departing from the spirit and scope of the invention, as defined in the appended claims, in which:

We claim:

1. A transponder for an RFID system, comprising:
a) a substrate including RF receiving and transmitting means;
b) data storage means configured for storing packetized data in a plurality of different standardized and globally addressable data formats transportable in an information network;
c) identifying code in a header in the standardized and globally addressable data format, the code identifying a data structure type and protocol in the stored packetized data of different formats; and
d) an indication in the header whether the packetized data should be processed locally at a reader device communicating with said transponder or sent to an external destination for processing upon activation of the transponder by a received transmission.

2. The transponder of claim 1 further comprising:
e) signal means responsive to an activation signal for transmitting or receiving and storing packetized data.

3. The transponder of claim 2 wherein the data structures are UDP and IP, alone or in combination.

4. The transponder of claim 2 wherein the packetized data is at least partly compressed.

5. A mobile phone device in a RFID system, comprising:
a) signal apparatus transmitting activation signals to at least one RFID transponder and receiving packetized datagrams in standardized and globally addressable data formats in a plurality of different data structures and protocols transportable in an Internet from the at least one transponder, the packetized datagrams including an indication whether received packetized datagrams should be processed locally at the mobile phone device or sent to an external destination address
b) reading apparatus processing the packetized datagrams from a transponder for delivery to a local application in the mobile phone device and an external destination address in a standardized and globally addressable data format;
c) a communication protocol stack in the mobile phone device routing the packetized datagrams in the standardized and globally addressable data format to at least one of the local application in the mobile device or the external destination address based on the received indication, and
d) reading apparatus processing the packetized datagrams from the transponder for delivery to a network or the application in a standardized and globally addressable data format.

6. The mobile device of claim 5 further comprising:
e) at least one application stored in the mobile phone device and responsive to the packetized data in the standardized and globally addressable data format.

7. The mobile device of claim 6 further comprising:
f) header processing means decompressing or expanding or providing omitted fields in the datagram.

8. The mobile device of claim 7 further comprising:
g) parsing means processing datagrams for transmission to the network.

9. The mobile device of claim 5 wherein the packetized datagram is in UDP or IP or combined UDP/IP format including a header with at least partly compressed or shortened or omitted fields.

10. The mobile device of claim 9, wherein the packetized datagrams are at least partly compressed.

11. A RFID system, comprising:
a) a transponder configured for containing packetized datagrams in standardized and globally addressable data formats in a plurality of different data structures and protocols and responsive to activation signals, the packetized datagrams including an indication whether received packetized datagrams should be processed locally where received or sent to an external destination address;
b) a mobile phone device generating the activation signals and sending/receiving the packetized datagrams to/from the transponder;
c) a communication protocol stack stored in the mobile phone device processing and routing the datagrams;
d) a network linked to the mobile phone device receiving and transmitting the packetized datagrams; and e) a reader device in the mobile phone device processing the packetized datagrams transmitted from the transponder for delivery to and processing by network or an application in the reader in a standardized and globally addressable data format, according to the indication in the packetized datagrams.

12. The RFID system of claim 11 wherein the reader is located in the network.

13. The RFID system of claim 11 wherein the communication protocol stack checks a checksum in the packetized datagram against the packet contents and notifies the reader the transmission has failed if the checksum is not valid.

14. The RFID system of claim 13 wherein the communication protocol stack requests a re-transmission from the transponder if the checksum is not valid.

15. The RFID system of claim 13 wherein the communication protocol stack drops the packetized datagram or notifies an application running in the mobile terminal if a re-transmission is unsuccessful.

16. The RFID system of claim 13 wherein the communication protocol stack transmits the packetized datagram to an application running in the terminal or to an application running in the network.

17. The RFID system of claim 13 wherein the communication protocol stack parses a header in the packetized datagram and routes the packetized datagram to a destination identified in the header if a checksum in the packetized datagram is valid.

18. The RFID system of claim 13, wherein the packetized datagrams are at least partly compressed.

19. A method for routing packetized data between a data carrier and a destination address comprising:
   a) receiving and sending a data packets in a standardized and globally addressable formats in a plurality of different data structures and protocols including a header and a payload from and to the data carrier;
   b) identifying the format among the different formats of the data packet via a code in the header including an indication whether the data packet should be processed locally at a reader device communicating with a transponder or sent to an external destination for processing;
   c) processing the data packet according to the identified standardized and globally addressable format after validation of the header; and
   d) routing the processed data packet directly to a destination address defined in the standardized and globally addressable format or to a local address of an application running in a receiver, according to the indication in the data packet.

20. The method according to claim 19, wherein the data packet comprises an identification data, a header data and a payload data, packetized according to any one of several standardized and globally addressable formats.

21. The method according to claim 20, wherein the header data is UDP header data.

22. The method according to claim 20, wherein the header data is at least partly in compressed form.

23. The method according to claim 22, wherein the processing comprises decompressing the received header data.

24. The method according to claim 20 wherein the payload data is at least partly in compressed form.

25. The method according to claim 20 wherein the payload data is in uncompressed form.

26. The method according to claim 20 wherein the header data includes a looped-back address if the destination is the receiver.

27. The method according to claim 19 wherein the data packet without identification data is transportable in an information network.

28. The method according to claim 19, wherein the data carrier is an RFID tag.

29. The method according to claim 19, wherein the destination address is a multicast address of a personal area network internet.

30. The method according to claim 19 wherein the routed packets can be directed via an IP stack to a network or an application within the device receptive to the standardized and globally addressable format.

31. The method according to claim 30, wherein the network can be an external network (e.g.) an Internet) or a local network (such as a personal area network, or a local area network).

32. A method for writing a packetized data to a data carrier, where the data carrier is an RFID tag, comprising;
   determining if a tag is writeable and, if so, alerting an application program executable in a mobile phone device or a network to prepare to transmit data after a reader completes a handshake with the tag;
   transmitting the data to the reader from the application program in the mobile phone device or the network for retransmission of the data to the tag in a format that indicates the location for processing the data at the reader or an alternate external destination;
   appending a RFID header to the data;
   receiving and storing the transmitted data in the tag from the application or network which over-writes the data in an erasable read-only memory included in the tag; and
   transmitting an acknowledgment signal to the application via the reader.

33. A system for routing packetized data comprising:
   a) at least one data configured for having-at least one data packet embedded therein in standardized and globally addressable format, in a plurality of different data structures and protocols, the data packet including an indication whether the data packet should be processed locally at a mobile phone device or sent to an external destination address;
   b) a data receiving (reading) device or data sending (writing) device in the mobile phone device for receiving or sending the at least one embedded data packet from the said at least one data carrier;
   c) a data routing device in the mobile phone device including an IP stack connectable to the data receiving device for routing the received data packet directly to a destination address, via the IP stack according to the destination address in the data packet; and
   d) an application at a local address in the data routing device receptive to a selected standardized and globally addressable format for receiving and processing the routed received data packet, according to the indication in the data packet.

34. A system of claim 33, wherein the at least one data packet is at least partly compressed.

35. A system of claim 33, wherein the at least one data packet is transportable in an Internet.

36. A computer readable medium for storing program code, executable in a computer system, for routing packetized data between a data carrier and destination address, the medium comprising:
   a) program code configured for sending data packets in a standardized and globally addressable formats of different data structures and protocols including a header and a payload from and to the data carrier;
   b) program code for identifying a the format among the different formats of the data packet via a code in the header including an indication whether the data packet should be processed locally at a reader device communicating with a transponder or sent to an external destination for processing;

c) program code for processing the data packet according to the identified standardized and globally addressable format; and d) program code for routing the processed data packet to a destination address defined in the standardized and globally addressable format and according to the indication in the data packet, without alteration of the data packet.

37. A transponder for an RFID system, comprising:

a) a substrate including RF receiving and transmitting means;

b) data storage means configured for storing packetized data in standardized and globally addressable data formats, in a plurality of different data structures and protocols transportable in a distributed information network; and c) identifying code in the standardized and globally addressable format identifying the data structure and protocol, the packetized data including an indication whether received packetized data should be processed locally at a mobile phone device or sent to an external destination address upon activation of the transponder by a received transmission, wherein the transmitting means transmits the packetized data to an application for routing without alteration of the packet, according to the indication in the packetized data.

38. A mobile phone device in a RFID system, comprising:

a) signal apparatus configured for transmitting activation signals and sending/receiving packetized datagrams in standardized and globally addressable data formats, in a plurality of different data structures and protocols, the packetized datagrams including an indication whether received packetized data should be processed locally at a device or sent to an external destination address and transportable in a distributed information network comprising an Internet to/from at least one transponder;

b) a communication protocol stack processing and routing packetized datagrams within the mobile phone device or to the network;

c) stored programs operating the mobile phone device in the RFID system and implementing communications with a the network;

d) reading apparatus processing the packetized datagrams from a transponder for delivery to a the network or application, according to the indication in a packetized datagram, without alteration of the packetized datagrams, wherein the packetized datagram is in UDP or IP or combined UDP/IP format including a header; and e) header processing means decompressing or expanding or providing omitted fields in the packetized datagram.

39. A REID system, comprising:

a) a transponder configured for containing packetized datagrams in selectable standardized and globally addressable data formats in a plurality of different formats transportable in a network and responsive to activation signals, the packetized datagrams including an indication whether received packetized data should be processed locally where received or sent to an external destination address;

b) a mobile phone device generating the activation signals and sending/receiving the packetized datagrams to/from the transponder;

c) a communication protocol stack stored in the mobile phone device processing and routing the packetized datagrams;

d) a network linked to the mobile phone device terminal receiving and transmitting the packetized datagrams; and e) a reader in the mobile phone device terminal processing the packetized datagrams transmitted from the transponder for delivery to the network or a local application in the mobile phone device without alteration of the packetized datagrams wherein the communication protocol stack parses a header in the packetized datagram and routes the packetized datagram to a destination, according to an indication in the packetized datagrams if a checksum in the packetized datagram is valid.

40. A mobile phone device in a REID system, comprising:

a) signal apparatus transmitting activation signals and sending/receiving packetized datagrams in a plurality of different standard addressable global formats including, an indication whether the packetized datagrams should be processed locally where received or sent to an external destination address;

b) a communication protocol stack in a mobile phone device processing and routing the packetized datagrams within the mobile phone device or in a network;

c) stored programs operating the mobile phone device in the RFID system and implementing communications with the network and at least one transponder; and d) reading apparatus processing the packetized datagrams from a transponder for delivery to the network or to an application in the mobile phone device, according to the indication in the packetized datagram.

41. The mobile device of claim 40 wherein the stored programs include an application for processing failed delivery of packetized delivery.

* * * * *